United States Patent [19]

Inoue

[11] 4,319,946

[45] Mar. 16, 1982

[54] APPARATUS FOR CLASSIFYING AND REORGANIZING A PROCESSED LONG LENGTH OF FILM INTO LENGTHS OF FILM HAVING SAME FRAME SIZE

[76] Inventor: Shoji Inoue, No. 9, Aizumi-cho, Shinjuku-ku, Tokyo, Japan

[21] Appl. No.: 200,043

[22] Filed: Oct. 22, 1980

[30] Foreign Application Priority Data

Feb. 1, 1980 [JP] Japan .................................. 55/11643

[51] Int. Cl.[3] ......................... B31F 5/00; G01B 19/02

[52] U.S. Cl. .................................... 156/350; 156/353; 156/364; 156/378; 156/443; 156/502; 156/505; 156/512

[58] Field of Search ............... 156/353, 364, 378, 502, 156/505, 506, 556, 512, 443, 350; 209/12, 509

[56] References Cited

U.S. PATENT DOCUMENTS 3,925,143 12/1975 Aldo .................................. 156/505

4,046,614 9/1977 Zahn et al. .......................... 156/378

OTHER PUBLICATIONS

Mitomo Publication, K.K. Nikkan–Labo, 6-17-80, p. 129.

Doi Publication, K.K. Nikkan–Labo, Jun. 20, 1977.

*Primary Examiner*—Paul J. Thibodeau

*Attorney, Agent, or Firm*—Eric H. Waters

[57] ABSTRACT

Apparatus for automatically classifying and reorganizing a processed long length of film connected together with a series of separate rolls of exposed film having different frame sizes, into lengths of film each having the same frame size, comprising an optical detector for detecting the frame sizes and the spliced portion of the films, a cutter for cutting the spliced portion of films having different frame sizes in sequence, a reorganizing means for forming the classified and cut films into lengths of film each having the same frame size, a classification guide mechanism, spindles for winding said lengths of film separately, and an electronic controller for controlling automatically the operations of said apparatus in relevant sequence.

4 Claims, 10 Drawing Figures

APPARATUS FOR CLASSIFYING AND REORGANIZING A PROCESSED LONG LENGTH OF FILM INTO LENGTHS OF FILM HAVING SAME FRAME SIZE

BACKGROUND OF THE INVENTION

The present invention relates to an apparatus for automatically classifying and reorganizing a processed long length of film connected together with a series of separate rolls of exposed film having different frame sizes, into a plurality of lengths of film each having the same frame size.

Generally, in the processing laboratories, a large number of rolls of exposed film for photograph contained in the patrones forwarded to the laboratories are taken out of the patrones in a dark room and the separate rolls of exposed film in a series are joined or spliced together into a long length of film for subjecting them to such processes as developing-drying through an automatic film processor. However, at present in most popular 35 mm rolls of exposed film contained in patrones forwarded to the laboratories there are two frame sizes, namely Leica size and one-half of the Leica size, the so-called "half size", and also the frame size of roll of exposed film is not indicated usually on the patrone or the invoice. Accordingly, the frame size of each of rolls of exposed film cannot be discriminated until the rolls of film have been developed, and thus a long length of film in which a series of separate rolls of exposed film have been joined or spliced together for processing in the automatic processor contains films having different frame sizes, that is, ordinarily, said long length of film contains films of Leica size and films of half size together in the mixed state.

Accordingly, in order to print the pictures continuously and efficiently by an automatic printing machine using a processed long length of film which has passed an automatic processor, the operators must carry out the works for discriminating the frame sizes of films in said processed long length of film visually one by one, and cutting and classifying it and then reorganizing the classified films so as to have a plurality of lengths of film for printing each having the same size. Thus, there are required a considerable time and labour to deal with a large quantity of film in the progress of work before printing in the processing laboratories.

SUMMARY OF THE INVENTION

In view of the above-mentioned present situation, the object of the present invention is to provide a novel apparatus which can save the labours of operators and carry out said progress of work before printing rapidly and efficiently by automating the afore-mentioned operators' works.

Basically, the apparatus of the present invention comprises an optical detector for detecting the frame sizes of each film and the spliced portions of the films in said processed long length of film at an introducing section of the apparatus and then applying the detected data as electric signals, an automatic cutter for cutting the spliced portions of the films having different frame sizes in sequence in said long length of film by an electric control, an automatic reorganizing means for splicing the leading end of the cut long length of film and the trailing end of the previously cut film, each film having the same frame size, by placing the leading end and the trailing end of each of said films opposite with each other at the splicing position of an automatic splicing means by an electric control, an automatic classification guide mechanism which comprises a plurality of stages of guide passages for classifying and separately delivering the films according to their frame sizes by way of vertically shifting and changing the guide passages by an electric control, driving rollers each provided relatively to each stage of the guide passages in said automatic classification guide mechanism and transporting the films in the positive and reverse directions by pulse motors which are electrically controlled, and an electronic controller for controlling, receiving electric signals from the optical detector, said automatic cutter, automatic reorganizing means, automatic classification guide mechanism and pulse motors for driving rollers.

Also, there are provided separate spindles for winding each of the reorganized lengths of film which have been classified according to their frame sizes and transported from the driving rollers.

The apparatus for automatically classifying and reorganizing a processed long length of film into lengths of film having same frame size according to the present invention will now be described referring to an embodiment shown in the drawings.

DETAILED DESCRIPTION OF THE INVENTION

Figure 1:
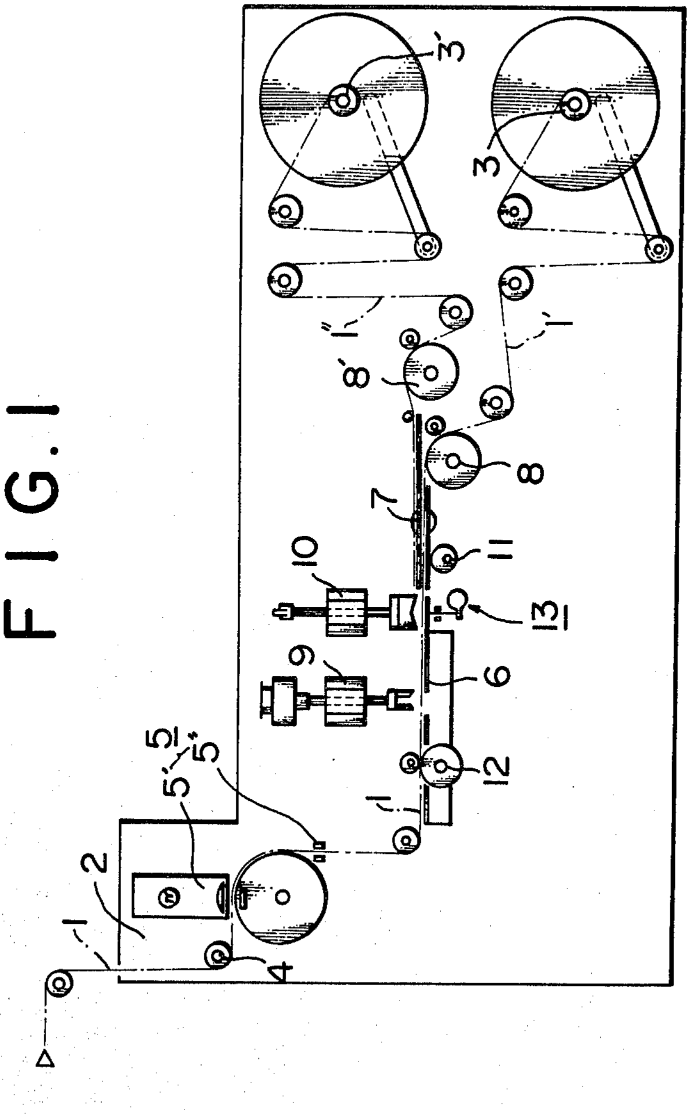
FIG. 1 is a schematic side view of one embodiment of the apparatus according to the present invention.

As shown in FIG. 1, a long length of film 1 formed by splicing a series of separate rolls of exposed film having different frame sizes which has been processed by an automatic processor (not shown in the drawings) is introduced into the apparatus through an introducing section 2. This long length of film 1 is automatically separated and classified in accordance with the frame size and reorganized into two lengths of film 1' and 1" each having the same frame size, and these films are wound up on respective winding spindles 3 and 3'. In this embodiment, the long length of film 1 comprises the films having the Leica size and the half size spliced in mixed state.

The long length of film 1 introduced through the introducing section 2 is transported passing through a guide roller 4, an optical detector 5, a fixed guide passage 6 and an automatic classification guide mechanism 7 by driving rollers 8 and 8' and is wound up on the winding spindles 3 and 3'. In FIG. 1, the long length of film 1 is shown to be would on the winding spindle 3 transported by the driving roller 8 through the lower guide passage in the automatic classification guide mechanism 7. Further, an automatic cutter 9 is provided above the fixed guide passage 6, and an automatic splicer 10 is provided above and at the rear end of the same guide passage 6. The automatic classification guide mechanism 7 comprising a plurality of stages of guide passages (two stages in the drawings). These two stages are moved up and down by means of a lifting cam 11 so as to switch the guide passages.

Figure 2:
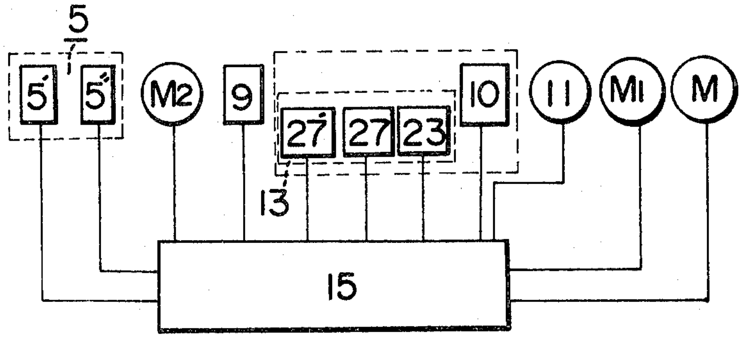
FIG. 2 is a block diagram showing the electronic controller in the apparatus and its electric control.
Figure 3:
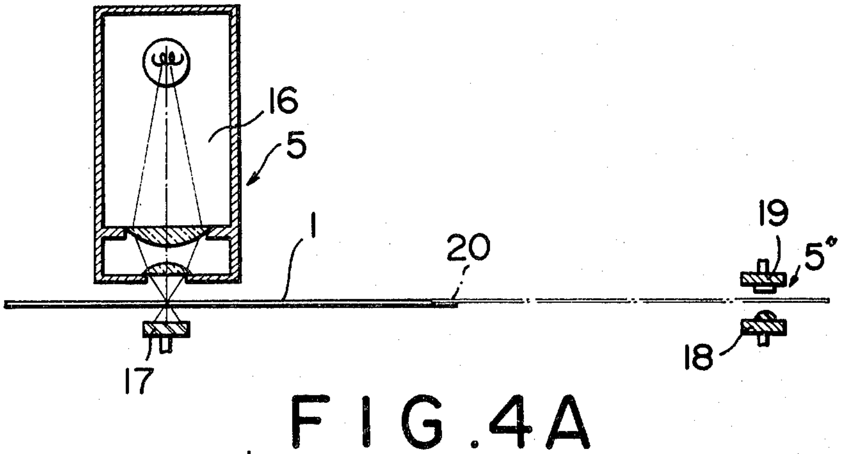
FIG. 3 is a longitudinal section of an optical detector in the apparatus of this invention.
Figure 5:
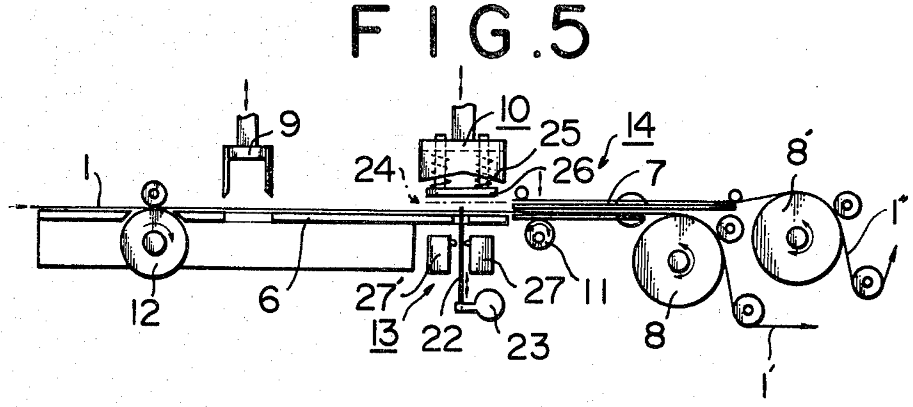
FIG. 5 is a side view of the apparatus of this invention showing in detail important parts shown in FIG. 1.

The automatic reorganizing means 14 is organized in relation to a transfer roller 12 provided in the fixed guide passage 6 preceded by the automatic cutter 9, an automatic splicer 10, an abutment detecting means 13 for detecting abutment of the right and left films provided below the automatic splicer 10 mounted at the rear end of the fixed guide passage 6, an automatic classification guide mechanism 7, and the driving rollers 8 and 8' (refer to FIG. 5). The driving rollers 8 and 8' and the transfer roller 12 are connected to pulse motors (not shown) respectively. Each of the rollers, the automatic cutter 9, automatic splicer 10, automatic classification guide mechanism 7 and the automatic reorganizing means 14 are controlled by an electronic controller 15 illustrated in FIG. 2 but not shown in FIG. 1.

The function and electric control of the present apparatus will be described in detail referring to FIGS. 1 through 7.

Figure 4A:
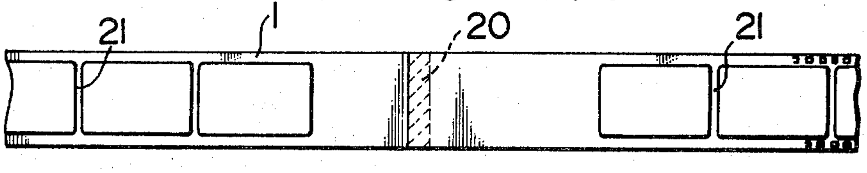
FIG. 4A shows a spliced portion of a long length of film in a case wherein the two films placed on the right and left sides of the spliced portion have the same frame size of Leica.
Figure 4B:
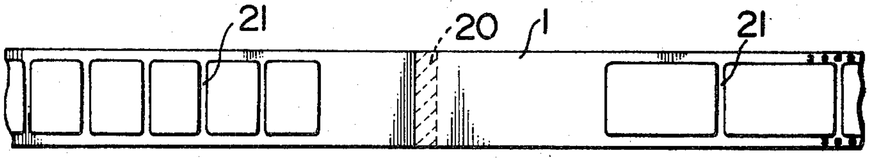
FIG. 4B shows a spliced portion of a long length of film in a case wherein the film on the right side of the spliced portion has a frame size of Leica, while the frame size of the film on the left side is of half size.
Figure 6:
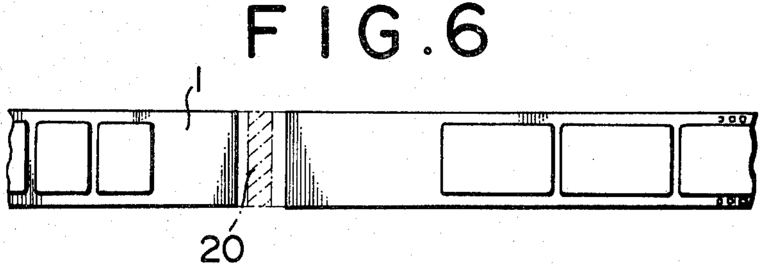
FIG. 6 is a view explaining and showing a state in which the spliced portion shown in FIG. 4B has been cut off.
Figure 7A:
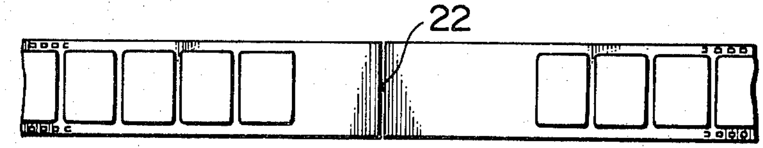
FIG. 7A shows the state that the leading end of the cut long length of film and the trailing end of the previously cut film having the same size (such as half size) to be re-spliced are abutted at the splicing portion.
Figure 7B:
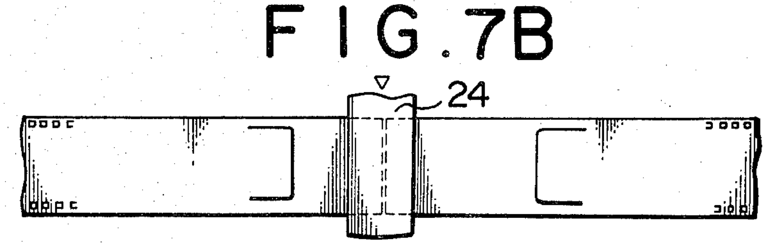
FIG. 7B shows the state that an adhesive tape is delivered from the delivery section (not shown) of adhesive tape onto the abutting portion shown in FIG. 7A and is pressed on said abutting portion.
Figure 7C:
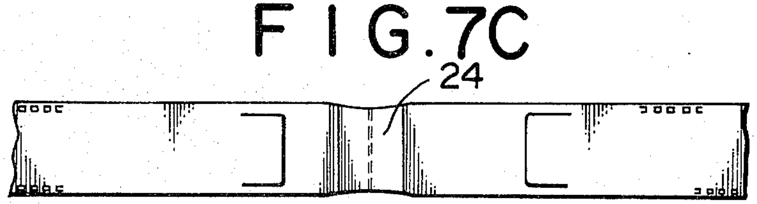
FIG. 7C shows the state that the adhesive tape shown in FIG. 7B is cut off along both lateral sides of the films.

The optical detector 5 provided at the introducing section of this apparatus comprises a frame size detector 5' and a splicing portion detector 5'' for the film. The frame size detector 5' is formed by a light source 16 and a light detecting element 17 in pair, and electric signals from the light detecting element 17 are applied to the electronic controller 15. The splicing portion detector 5' is formed by a pair of a light emitting element 18 and a light detecting element 19, and electric signals from the light detecting element 19 are applied to the electronic controller 15. When the spliced portion 20 of the long continuous film 1 introduced into the apparatus passed through the splicing portion detector 5'' (refer to FIGS. 3, 4A and 4B), the light detecting element 19 detects the spliced portion 20, i.e. the portion where the light penetration is the worst, and then applies electric signals to the electronic controller 15. At the same time, the frame size detector 5' commences the detecting operation, and the light detecting element 17 detects the gap portion 21, i.e. the portion where the light penetration is most excellent between the frames in the long length of film 1 passing therethrough and then applies electric signals to the electronic controller 15. In this electronic controller 15, from the signals applied at the said gap portions 21 on a plurality of frame in sequence detected successively when the long length of film 1 passed through the frame size detector 5', it is possible to discriminate the frame size of film as Leica size, for example, from the length between the gap portions 21 of film passed through the frame size detector 5' comparing the length between the gap portions 21, namely the length of the frame, with that of Leica size, for example, which has previously been memorized. If a film preceding the spliced portion 20 which has passed through the splicing portion detector 5'' has the same size as Leica as shown in FIG. 4A, the long length of film is transported to the winding section by the driving roller 8 in a state shown in FIG. 1, and is wound on the winding spindle 3 as a length of film 1' of Leica size. In contrast, if a film passing through the frame size detector 5' has a different frame size from that previously passed therethrough, that is, the latter film is discriminated to have half size as shown in FIG. 4B from the signal applied by the frame size detector 5' in the electronic controller 15, the spliced portion 20 of said film is caused to stop at the position of the automatic cutter 9 provided on the fixed guide passage 6. Successively, the automatic cutter 9 is lowered by the electronic controller 15, whereby the spliced portion 20 of the film is cut off as illustrated in FIG. 6. The position of the stoppage is determined by transporting the long length of film at the distance from the position of the splice detector 5'' to the automatic cutter 9 under the pulse control of the pulse motor M of the driving roller 8 operated by the electronic controller which has received electric signals detected at the splicing portion detector 5''. Nextly, when the spliced portion 20 is cut down by said automatic cutter, the trailing end of the cut preceding film is transported to the entrance of the lower guide passage in the automatic classification guide mechanism 7 by the driving roller 8 driven by the pulse motor M controlled by the electronic controller 15 and is stopped as shown in FIG. 5. Then, the automatic classification guide mechanism 7 is shifted downwardly by a lifting and lowering cam 11 controlled by the electronic controller 15, whereby the upper guide passage of the automatic classification guide mechanism 7 is positioned at the same level with the fixed guide passage 6. (FIG. 5 shows the state before said classification guide mechanism is shifted downwardly.) At the same time, a detecting switch lever 22 of the abutment detecting means 13 is shifted by a lifting solenoid 23 controlled by the electronic controller 15 (refer to the dotted line in FIG. 5.) Then, the previously cut film which is in the upper guide passage (in this case, the film has half size) is backwardly transported from the upper guide passage to the fixed guide passage 6 through a reverse movement of the driving roller 8' driven by a pulse motor $M_1$ controlled by the electronic controller 15. When the trailing end of the previously cut film abuts the detecting switch lever 22 as shown in FIG. 7A, a switch 27' shown in FIG. 5 is switched on and then applies a stop signal to the electronic controller 15, and the trailing end of the right-hand film stops at this position. In the meantime, the leading end of the long length of film, the spliced portion of which has been cut by the automatic cutter 9, is transferred through the fixed guide passage by the transfer roller 12 driven by the pulse motor $M_2$ controlled by the electronic controller 15. When the leading end of the film abuts the detecting switch lever 22 as shown in FIG. 7A, a switch 27 shown in FIG. 5 is switched on and applied a stop signal to the electronic controller 15, whereby the leading end of the cut long length of film stops at the position. Simultaneously, the detecting switch lever 22 of the automatic abutment detecting means 13 returns to the original position. In this way, the leading end of the cut long length of film and the trailing end of the previously cut film having the same frame size (such as half size) to be re-spliced are abutted at the splicing portion of the automatic splicer 10. Next, an adhesive tape 24 is delivered from the delivery section (not shown) of adhesive tape onto the abutting portion of the right and left films under the control of the electronic controller 15 as shown in FIG. 7B, and a push plate 26 with a cutter 25 of the automatic splicer 10 is lowered and pressed against the adhesive tape 24 in bridging the abutment portion. At the same time, the adhesive tape 24 is cut off by a cutter 25 along both lateral sides of the films as shown in FIG. 7C, whereby the films are spliced again. Thus in this case, the half sized film which has previously been cut is re-spliced with the half-sized film which is at the foremost part of the long length of film. After the completion of this re-splicing process, the re-spliced film is transported through the upper guide passage in the automatic classification guide mechanism 7 by the driving roller 8' controlled by the electronic controller 15, and is wound on the winding spindle 3' as a length of film 1'' of half size. While the long length of film 1 is transported by the driving roller 8' and wound on the winding spindle 3', if it is judged by the electronic controller 15 which receives a signal from the optical detector 5 that the frame size of the film continuous to the spliced portion 20 in the long length of film 1 is different (in this case, the frame size is Leica size), the operations corresponding to the abovedescribed processes are carried out, and thus the long length of film 1 passes through the lower guide passage of the automatic classification guide mechanism 7 and is wound on the winding spindle 3 as a length of film 1' of Leica size. In this way, every time the films having the different frame sizes (in this case, Leica size and half size) in the long length of film arrive at the optical detector 5, the above-mentioned operations are repeated, and the films having the different frame sizes are classified and reorganized into two lengths of film according to their frame sizes and wound on the winding spindles 3 and 3' respectively.

The order of arranging the frame size detector 5' and the splicing portion detector 5'' in the optical detector 5 of this apparatus described according to the embodimental example can be reversed, and it is also possible to operate both of the detectors 5' and 5'' by the same optical detector. Furthermore, the abutment detecting means at the splicing portion of the automatic splicer 10 in the automatic reorganizing means may also be substituted by other proper means, and the automatic splicer 10 can also be substituted by other automatic splicer without using the adhesive tape. In the case that films having the different frame sizes other than Leica size and half size are mixed in a long length of film, the apparatus of the present invention can be of course re-arranged to meet the required number of different frame sizes to be classified and reorganized in accordance with the apparatus described in the above-mentioned embodiment. In addition, the apparatus of this invention is not restricted to the application on the 35 mm roll of film, that is, it is also applied on other roll of film.

The apparatus according to this invention can be used most conveniently when the apparatus is installed at the outlet of the drying box of an automatic processor, and to introduce a processed long length of film successively into this apparatus, but a processed long length of film may be once wound up and introduced into the apparatus of this invention installed in the separate place.

As described above, the apparatus according to the present invention is the novel and excellent apparatus which can classify and reorganize automatically a processed long length of film including a large number of films having the different frame sizes into a plurality of lengths of film each having the same frame size and winding these lengths of film separately on the respective winding spindles, and through the apparatus of this invention, it becomes possible to economize considerably the operators' works which heretofore required a large amount of time and labour to prepare said lengths of film to submit these to the respective automatic printing machines, which contributes very much in the rationalization and improvement in the processing laboratories.

I claim:

1. An apparatus for automatically classifying and reorganizing a processed long length of film connected together with a series of separate rolls of film having different frame sizes, into a plurality of lengths of film each having the same frame size, said apparatus comprising:

- an optical detector for detecting the frame sizes of each film and the spliced portions of the films in said processed long length of film at an introducing section of the apparatus and then applying the detected data as electric signals,
- an automatic cutter for cutting the spliced portions of the films having different frame sizes in sequence in said long length of film by an electric control,
- an automatic reorganizing means for splicing the leading end of the cut long length of film and the trailing end of the previously cut film, each film having the same frame size, by placing the leading end and the trailing end of each of said films opposite with each other at the splicing position of an automatic splicing means by an electric control,
- an automatic classification guide mechanism which comprises a plurality of stages of guide passages for classifying and separately delivering the films according to their frame sizes by way of vertically shifting and changing the guide passages by an electric control,
- driving rollers each provided relatively to each stage of the guide passages in said automatic classification guide mechanism and transporting the films in the positive and reverse directions by pulse motors which are electrically controlled, and
- an electronic controller for controlling, receiving electric signals from the optical detector, said automatic cutter, automatic reorganizing means, automatic classification guide mechanism and pulse motors for driving rollers.

2. An apparatus for automatically classifying and reorganizing a processed long length of film as claimed in claim 1, wherein separate spindles are provided for winding each of the reorganized lengths of film which have been classified according to their frame sizes and transported from the driving rollers.

3. An apparatus for automatically classifying and reorganizing a processed long length of film as claimed in claim 1, wherein said automatic reorganizing means comprises:

- a transfer roller for transferring the leading end of the long length of film cut by said automatic cutter to the splicing position of said automatic splicer by said pulse motor controlled by said electronic controller, means for reversely transferring the trailing end of the previously cut film having the same frame size to be re-spliced to the leading end of the long length of film up to the splicing position of said automatic splicing means by the driving rollers through the corresponding guide passages of said automatic classification guide mechanism, an abutment detecting means for detecting the leading end and the trailing end of each of the films placed at the splicing position in said automatic splicer and then applying electric signals to stop the films toward said electronic controller, and an automatic splicer for splicing the abutting portion of said film ends by said electronic controller.

4. An apparatus for automatically classifying and reorganizing a processed long length of film as claimed in claim 1, wherein said automatic splicer comprises:

a delivery means for an adhesive tape and a push plate with a cutter moving up and down, for delivering the adhesive tape above the abutting portion of the right and left film ends to be re-spliced by said electronic controller, and through the downward movement of the push plate with the cutter, sticking the adhesive tape in bridging over said abutting portion, and at the same time cutting the tape on both lateral sides of the films.

* * * * *